E. HORTON,

Assignor, by mesne assignments, to THE SEMPLE AND BIRGE MANUFACTURING COMPANY.

WAGON SPRING.

No. 9,808. Reissued July 19, 1881.

Attest:

Saml. S. Boyd
Charles Pickles

Inventor:

Elijah Horton,
by C. D. Moody
atty

N. PETERS, Photo-Lithographer, Washington, D. C.

UNITED STATES PATENT OFFICE.

ELIJAH HORTON, OF OKEE, WIS., ASSIGNOR, BY MESNE ASSIGNMENTS, TO THE SEMPLE & BIRGE MANUFACTURING COMPANY, OF ST. LOUIS, MO.

WAGON-SPRING.

SPECIFICATION forming part of Reissued Letters Patent No. 9,808, dated July 19, 1881.

Original No. 74,363, dated February 11, 1868. Application for reissue filed December 18, 1880.

*To all whom it may concern:*

Be it known that I, ELIJAH HORTON, of Okee, Wisconsin, have made a new and useful Improvement in Wagon-Springs, of which the following is a full, clear, and exact description, reference being had to the annexed drawings, making part of this specification, in which—

Figure 1:
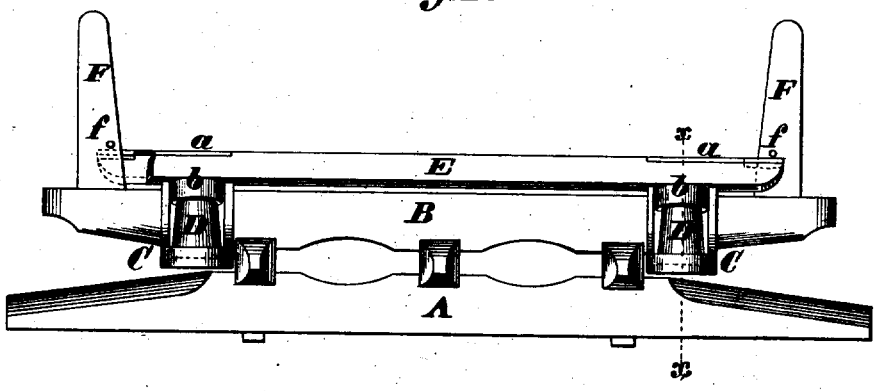
Figure 2:
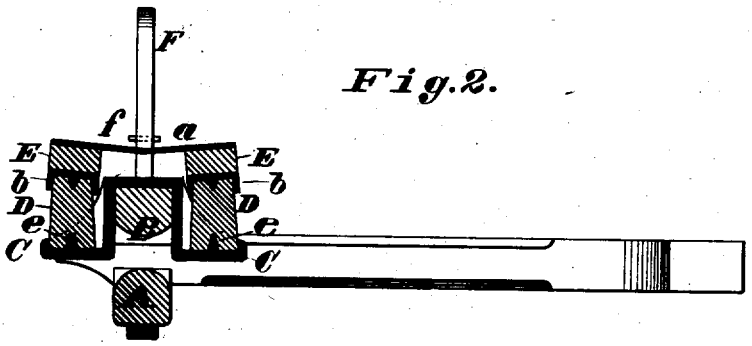

Figure 1 is a side elevation of an axle and bolster, with springs attached, after my plan; and Fig. 2 a cross-section taken on the line *x x* of Fig. 1, showing the stirrup and the method of securing the springs.

The same letters of reference denote the same parts.

A represents the axle of the wagon. B is the bolster. C represents the stirrup on the bolster. D D represent the rubber springs. E E represent bars or cross-pieces, which are supported by the springs, and which, in turn, support the wagon-box. The cross-pieces E E are connected together by ties, (marked *a a* in the drawings,) and they are secured to the rubber springs by metallic cups *b b*, which rest upon the upper ends of the springs, as seen in Fig 2.

The stirrup C is formed somewhat like a yoke, as seen in Fig. 2, and it sits over the bolster, so as to form suitable seats for the springs, without in any manner impairing the strength of the bolster.

F F represent the wagon-standards. The ties *a a*, which unite the bars E E, are notched to fit onto the standards, so that the bars or cross-pieces and the tops of the springs are kept in position by the standards, through which the stop-pins *f* pass. By removing one of these pins *f* the cross-pieces, springs, and stirrups can be at any time removed from the wagon. The springs D D are simply rubber blocks, which are secured in their places by the flanges which surround their ends, and by the tongues or spikes *e e*, which penetrate them, as seen in the drawings.

The improvement can readily be applied to lumber-wagons now in use without altering or disturbing any of the parts, thus making them spring-wagons when it may be desired to have them so.

I claim—

1. The stirrup C, constructed and applied substantially as shown and described, for the purposes set forth.

2. In combination with the stirrup C, the rubber springs D D, the cross-bars E E, the ties *a a*, and the cups *b b*, arranged substantially as shown and described, for the purpose specified.

3. A wagon-bolster spring combining in its construction a yoke which rests loosely upon the bolster, and a spring or springs which are sustained by the yoke, but which are not firmly fastened thereto.

4. A wagon-bolster spring having a yoke, of rigid material, shaped to closely fit the top and upper portion of the sides of the bolster, and supporting springs, respectively, at each side of the bolster, which in turn sustain, directly or indirectly, the wagon-bed, but which are not firmly attached to the yoke.

5. A wagon-bolster spring having a yoke shaped to fit the upper portion of and resting loosely upon the bolster, and supporting springs, respectively, at each side of the bolster, which in turn sustain, directly or indirectly, the wagon-bed, but which are not rigidly attached to the yoke, and which do not extend directly over the bolster.

6. A wagon-bolster spring having a yoke or saddle shaped to fit the top and upper portion of the sides of the bolster, said yoke or saddle supporting a spring or springs, the upper ends of which are united by a tie, which, when the springs are depressed, comes upon the saddle.

ELIJAH HORTON.

Witnesses:
JOHN W. GARDNER,
S. H. WATSON.